United States Patent [19]
Stephenson, III et al.

[11] Patent Number: 5,694,629

[45] Date of Patent: Dec. 2, 1997

[54] FILM TRANSPORT MECHANISM WITH TORQUE LIMITING CLUTCH

[75] Inventors: Stanley Ward Stephenson, III, Spencerport; Tom Michael Seamans, Corfu, both of N.Y.

[73] Assignee: Eastman Kodak Company, Rochester, N.Y.

[21] Appl. No.: 432,614

[22] Filed: May 1, 1995

[51] Int. Cl.$^6$ ........................... G03B 1/00
[52] U.S. Cl. ............ 396/395; 396/411; 242/356; 242/545.1
[58] Field of Search ............ 354/212, 213, 354/214; 242/356, 356.2, 545.1; 74/577.5 F; 192/41 R, 46, 47, 55.2, 56.6, 56.1, 69.3, 69.43; 396/411, 395

[56] References Cited

U.S. PATENT DOCUMENTS

| | | | |
|---|---|---|---|
| 1,865,559 | 7/1932 | DeMontgrand | 74/64 |
| 2,104,920 | 1/1938 | Ysskin | 464/37 |
| 2,637,987 | 5/1953 | Hill et al. | 192/56.1 |
| 2,826,107 | 3/1958 | Woods | 192/46 |
| 2,875,564 | 3/1959 | Werge et al. | 53/70 |
| 2,909,047 | 10/1959 | Walterschied-Muller et al. | 192/56.1 |
| 2,930,212 | 3/1990 | Walterscheid-Muller et al. | 192/56.1 |
| 3,138,084 | 6/1964 | Harvey | 354/213 |
| 3,659,798 | 5/1972 | Mindler et al. | 354/213 |
| 5,090,532 | 2/1992 | Bich | 192/56 R |
| 5,183,140 | 2/1993 | Nicoll | 192/56 R |
| 5,209,419 | 5/1993 | Zander | 242/71.1 |
| 5,337,971 | 8/1994 | Niedospial, Jr. | 242/348 |
| 5,453,808 | 9/1995 | Zawodny et al. | 354/212 |
| 5,480,015 | 1/1996 | Yang | 192/56.1 |

*Primary Examiner*—Eddie C. Lee
*Attorney, Agent, or Firm*—Peter J. Bilinski; Robert Luke Walker

[57] ABSTRACT

A camera film transport mechanism includes a torque limiting one-way drive clutch for preventing film damaging excessive torque loading or reverse rotation of the drive. The clutch includes coaxial inner and outer members. A resilient arm extends generally tangentially from one of the members with a free end biased against the other member and engagable with a tooth or abutment thereon to transmit torque therebetween. A sloping surface on one or both of the tooth and the arm end limits torque transmission by camming the arm out of engagement when the friction force is overcome. Multiple arms and/or abutment teeth may be provided and the arms may be arranged for either compressive or tensile loading. Slip torque deviation is limited by making the engaging surfaces from diverse materials, for example, an amorphous polymer, such as polycarbonate styrene, for one surface and a semi-crystalline polymer, such as nylon or acetal, for the other.

11 Claims, 4 Drawing Sheets

FILM TRANSPORT MECHANISM WITH TORQUE LIMITING CLUTCH

FIELD OF THE INVENTION

This invention relates to manual film transport mechanisms for photographic cameras and more particularly to film advance and rewind mechanisms including a one-way torque limiting clutch to prevent film damage.

BACKGROUND OF THE INVENTION

It is known in the art relating to manual film transport mechanisms for photographic cameras to provide one-way film advance and rewind devices effective to wind the film upon an associated film spool or drum while preventing the winding device or knob from forcing the film in a reverse direction that might cause film jamming. It is further known to provide some form of friction or slip clutch in a film advance or film drive mechanism to prevent the operator from exerting excessive force upon the film when it has reached a stopping point determined by a metering device or having reached the end of the film roll. Examples of such slip clutches are shown, for example, in U.S. Pat. Nos. 3,138,084 issued Jun. 23, 1964, and 3,659,798 issued May 2, 1972. The clutch in the latter reference also provides one-way drive.

SUMMARY OF THE INVENTION

The present invention provides a camera manual film transport mechanism including improved forms of clutch devices combining one-way drive action with a torque limiting feature. Such a torque limiting one-way drive clutch may be used in conjunction with the film advance wheel of the drive mechanism to limit the torque that may be applied to the film advance drum or spool, as well as to prevent reverse rotation of the advance wheel from driving the film backward in a manner that might result in film jamming. Similar clutch arrangements may be applied, if desired, to the rewind knob or other portions of the film transport mechanism.

In general, clutch devices in accordance with the invention utilize inner and outer coaxially rotatable surfaces one of which carries a resilient arm that engages the other and has an end portion engageable with an abutment or tooth on the other surface to provide one-way drive engagement for moving the film in a prescribed direction. In accordance with the invention, either the tooth or the tooth engaging portion of the arm end is angled sufficiently to allow the driving engagement to slip when a predetermined torque range is reached. This limits the torque which may be applied to drive the film and prevent damage due to excessive force being applied by the operator.

These and other features and advantages of the invention will be more fully understood from the following detailed description of the invention taken together with the accompanying drawings.

DETAILED DESCRIPTION OF THE INVENTION

Figure 1:
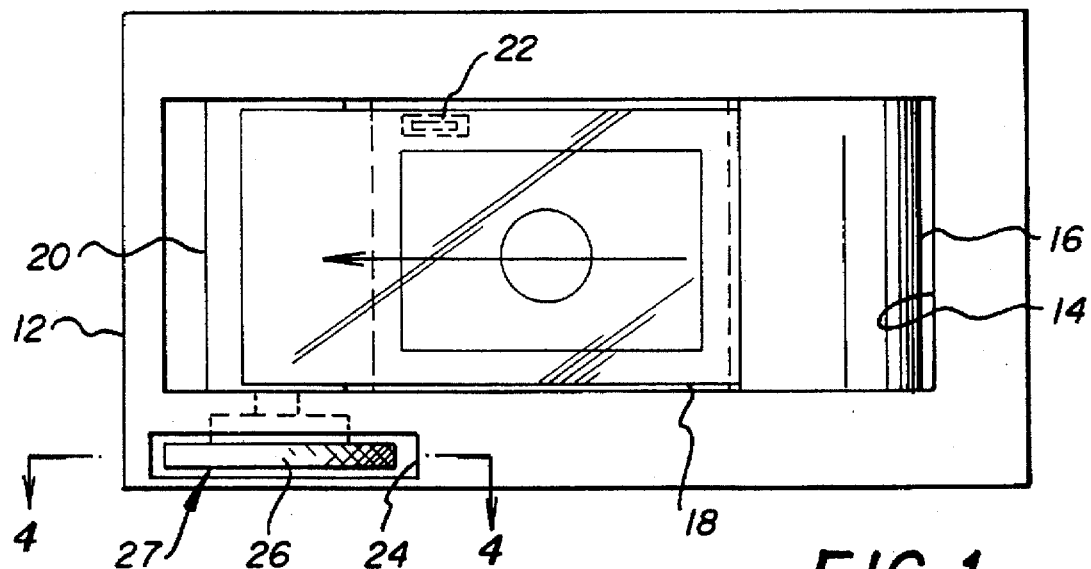
FIG. 1 is a schematic view of a camera including a film advance mechanism in accordance with the invention.

Referring now to the drawings in detail, numeral 10 generally indicates a photographic camera having a body 12 pictured with the back removed to show an interior cavity 14. Within the cavity, there is received a film cassette 16 from which a film 18 extends across the cavity and is wound on a take-up spool 20. A metering stop 22 is operative to engage perforations in the film 18 to position the film at each picture location. A slot 24 is provided in the back of the camera through which the outer edge of an advance thumbwheel 26 extends for engagement by the operator. Thumbwheel 26 connects through an internal clutch, not shown, with the take-up spool 20 for turning the take-up spool in a film advancing direction. The cassette 16, take-up spool 20, metering stop 22, thumbwheel 26 and its associated clutch, not shown, form part of a film transport mechanism 27 for moving film 18 within the camera 10.

Figure 2:
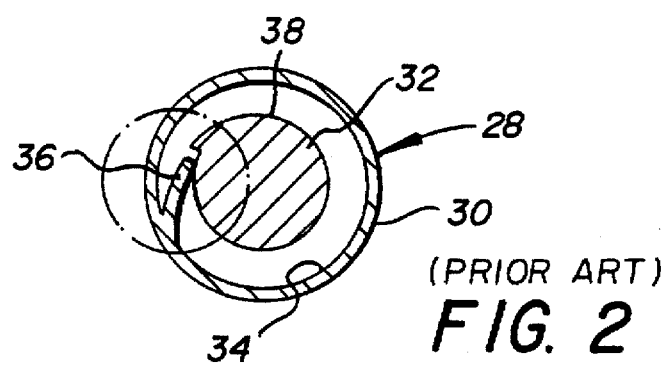
FIG. 2 is a cross-sectional view showing a prior form of one-way clutch for a film advance mechanism.

FIG. 2 shows the internal structure of a prior one-way clutch 28 mounted in a film advance wheel similar to thumbwheel 26. Clutch 28 comprises an annular outer ring 30 coaxial with an inner cam 32, both rotatable about a common axis. Ring 30 has an inwardly facing surface 34 from which a flexible resilient arm 36 extends inwardly into engagement with an outwardly facing surface 38 of the cam 32.

Figure 3:
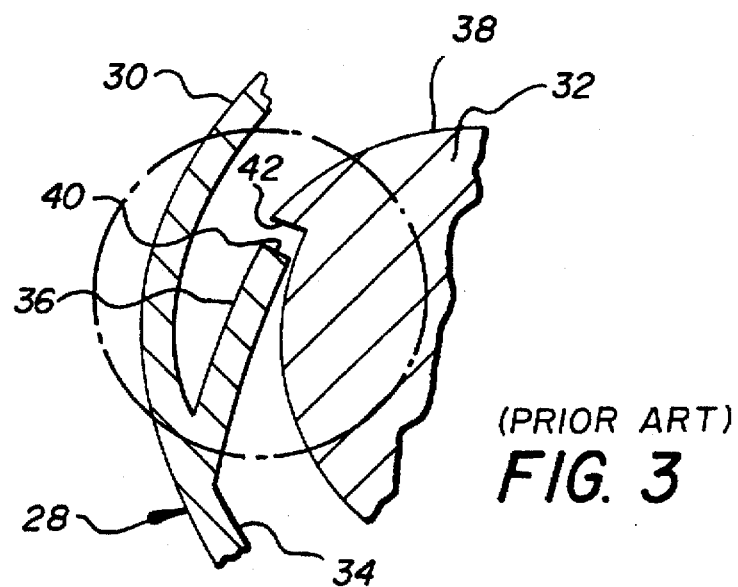
FIG. 3 is an enlarged view of a portion of the clutch of FIG. 2.

As is best shown in the enlarged view of FIG. 3, arm 36 has a squared-off end 40 which is positioned to engage a generally radial or slightly reverse angled tooth or abutment 42, formed on the outer surface of the cam 32, when the outer ring 30 is rotated clockwise as shown in FIGS. 2 and 3, such as by movement of the thumbwheel 26 leftward as shown in FIG. 1. When the clutch is thus engaged, rotation of the thumbwheel in the clockwise film advance direction causes rotation of the inner cam 32 and corresponding rotation of a film take-up spool 20 such as to move the film in a film advancing direction. If the thumbwheel is moved in the opposite, counterclockwise, direction, the resilient arm 36 is flexed so as to ride over the tooth 42 without rotating the inner cam. This one-way clutch action is aided by a faired portion of the outer surface 38 which extends in a clockwise direction from the outer edge of the counterclockwise facing tooth 42.

Figure 4:
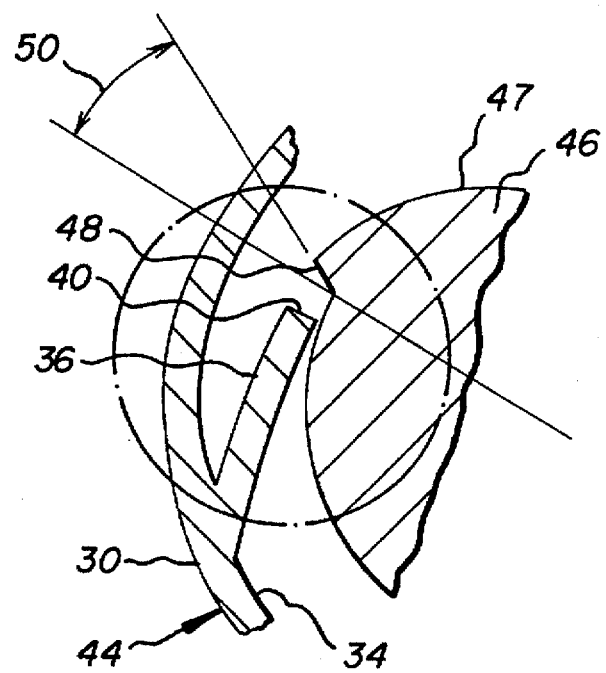
FIG. 4 is a view from the plane of the line 4—4 of FIG. 1 and similar to FIG. 3 but showing a first embodiment of torque limiting one-way clutch in accordance with the invention.

FIG. 4 shows a clutch 44 incorporated in the thumbwheel 26 of FIG. 1 and forming a first embodiment of the invention. Clutch 44 comprises a modification of the prior clutch 28 of FIGS. 2 and 3 which includes an outer ring 30 with inner surface 34 and resilient arm 36 with the squared end 40 as in the embodiment of FIG. 3. Clutch 44 also includes a cam 46 having an outer surface 47 and an abutment or tooth 48 with a surface opposing the end 40 of the arm 36. However, the surface of tooth 48, instead of being near radial, slopes outward away from the end 40 with a predetermined slip angle 50. This angle 50 is selected so that when the clutch is engaged, with the end 40 engaging tooth 48, a limited torque may be transmitted by clockwise rotation of the outer ring 30. However, when a predetermined torque level is exceeded, the outward force generated by the sloping tooth 48 will overcome friction and cause the resilient arm 36 to be cammed outward and slip, or disengage, from the tooth 42. In this manner, the clutch will slip at a predetermined maximum torque level so as to prevent excessive force being exerted on the film driven by the film advance wheel 26.

Figure 5:
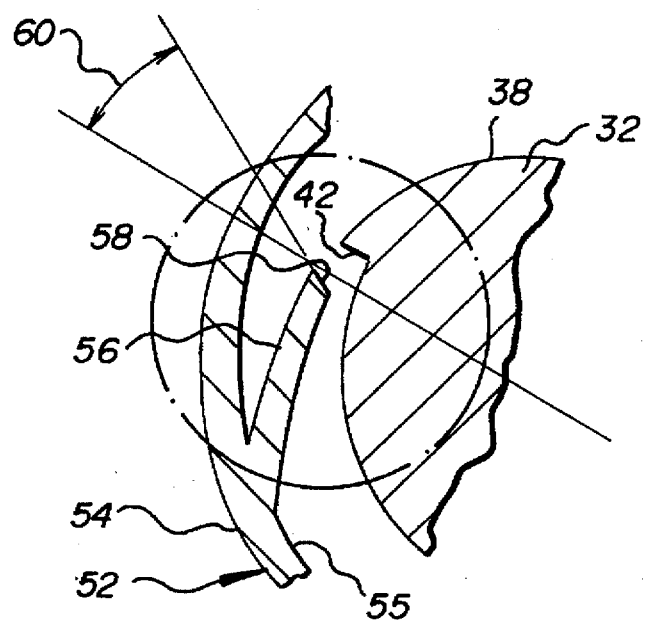
FIG. 5 is a view similar to FIG. 4 showing a second embodiment of torque limiting one-way clutch according to the invention.
Figure 6:
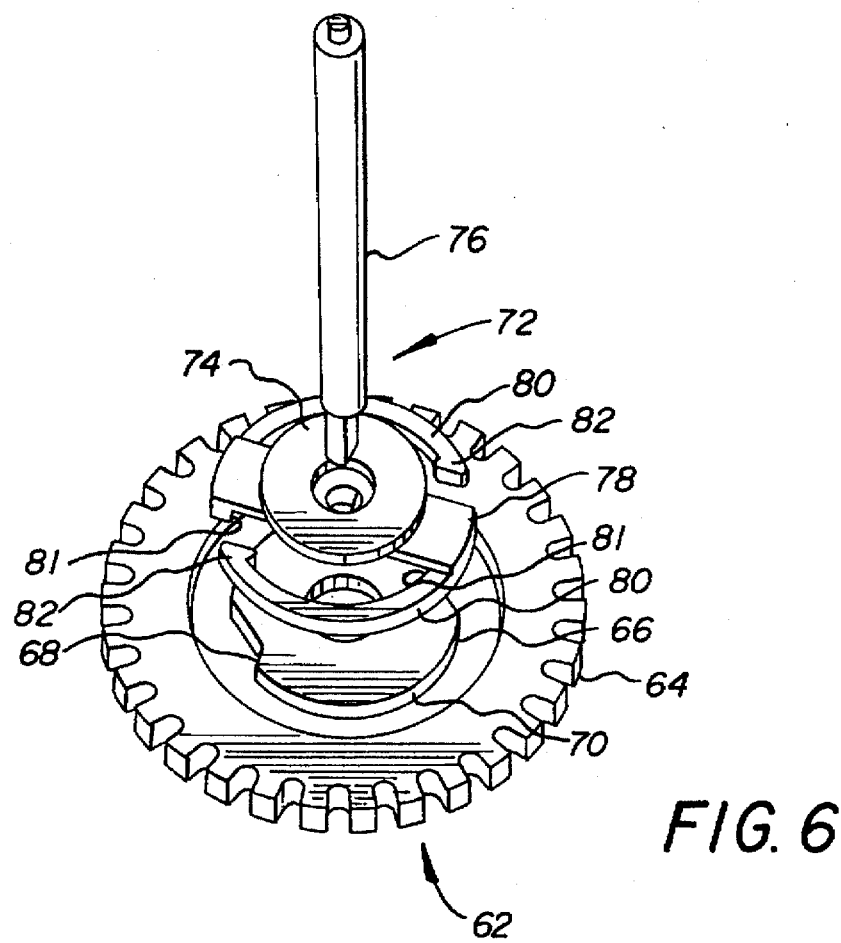
FIG. 6 is an exploded pictorial view illustrating a third embodiment of torque limiting one-way clutch for use in a film transport mechanism.
Figure 7:
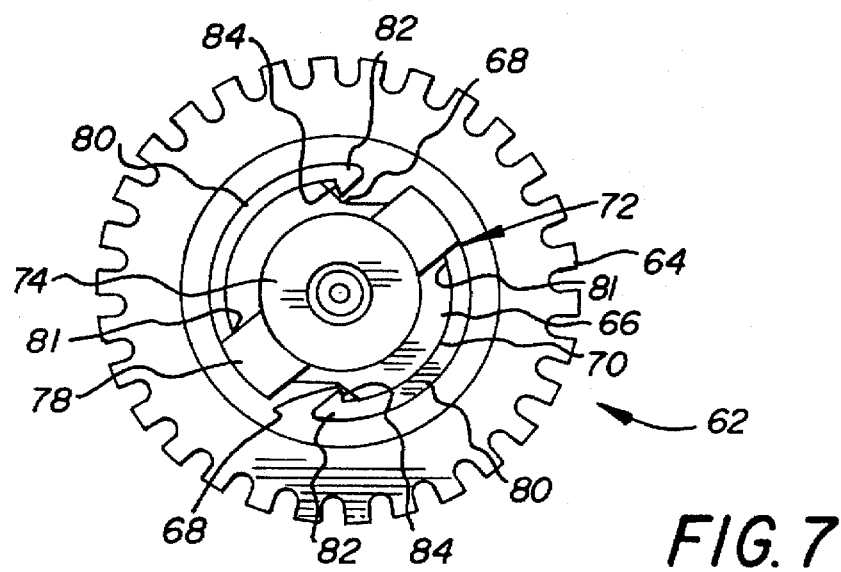
FIG. 7 is a plan view of the clutch of FIG. 6 shown in a disengaged position.

An alternative embodiment of clutch 52 is shown in FIG. 5 including a cam 32 with an outer surface 38 and radial tooth 42 like those in the embodiment of FIG. 3. Clutch 52 differs in use of a modified outer ring 54 with an inner surface 55 and a resilient arm 56 having an end 58 which slopes forward at a predetermined slip angle 60. Its operation is similar to that of the FIG. 4 embodiment in that when the end 58 engages the tooth 42, clockwise rotation of the outer ring will transmit a limited torque to the cam 32. However, when a predetermined torque is reached, the outward force created by the sloping end 58 engaging tooth 42 will cam the resilient arm 56 outwardly to disengage from the tooth and allow the clutch to slip, thus providing a torque limiting function for the clutch.

It should be apparent that, if desired, the features of the cam of FIG. 4 could be combined with the outer ring of FIG. 5 to provide a slip clutch in which both the tooth 48 of the cam and the end 58 of the resilient arm are sloped and the resulting combination would operate in essentially the same manner as with the embodiments previously described. However, because the friction forces might differ, the slip angle might need to be adjusted to obtain the desired torque limit for this combination. Also, it would be possible, if desired, to form clutches of the types just described with more than one resilient arm and/or more than one cam tooth for engagement with the arm or arms.

Referring to FIGS. 6–9, there is shown another form of torque limiting one-way clutch 62 intended for use in a camera film advance mechanism. Clutch 62 is contained within a film advance thumbwheel 64 which includes a central hub-cam 66 having a pair of sloping teeth 68 extending from a cam-like outer surface 70.

Coacting with the hub-cam 66 is a drive element 72 including a drive hub 74 connectable with a drive shaft 76 that drives a film advance mechanism not shown. The drive hub 74 carries a cross arm 78 on which are mounted a pair of resilient arms 80 extending from an inner surface 81 of the cross arm 78. The arms 80 are curved in generally arcuate fashion for riding in a recess of the thumbwheel surrounding the outer surface 70 of the hub-cam 66. At their ends distal from the cross arm 78, the resilient arms 80 include hooks 82. The hooks have inwardly directed generally radial end surfaces 84, best shown in FIG. 9, which are adapted to engage the sloping teeth 68 of the hub-cam.

When the thumbwheel 64 is rotated opposite to the film advance direction, that is in a counterclockwise direction as shown in the figures, the hook ends 84 are released from the sloping teeth 68. As rotation continues, the hooks 82 will ride up over the outer surface 70 of the hub-cam 66, preventing the transmission of any torque from the thumbwheel to the hub-cam in the reverse or rewind direction of film motion.

Figure 8:
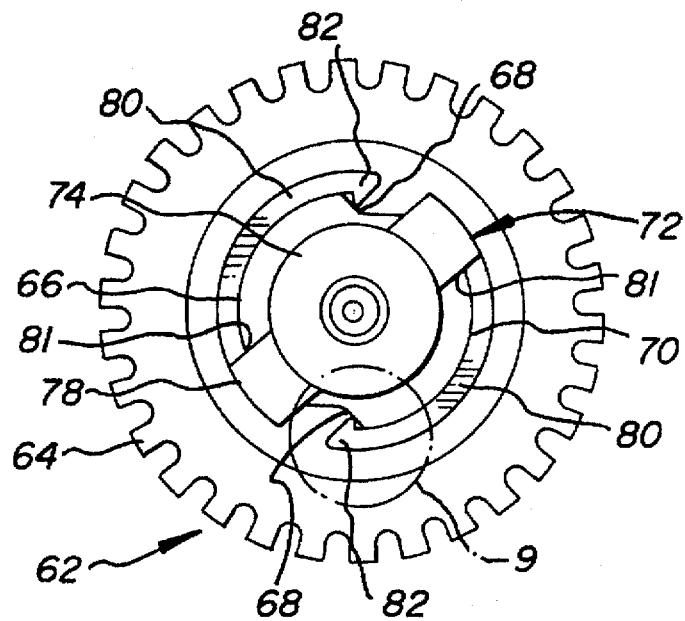
FIG. 8 is a view similar to FIG. 7 but showing the clutch in the drive engaged position.
Figure 9:
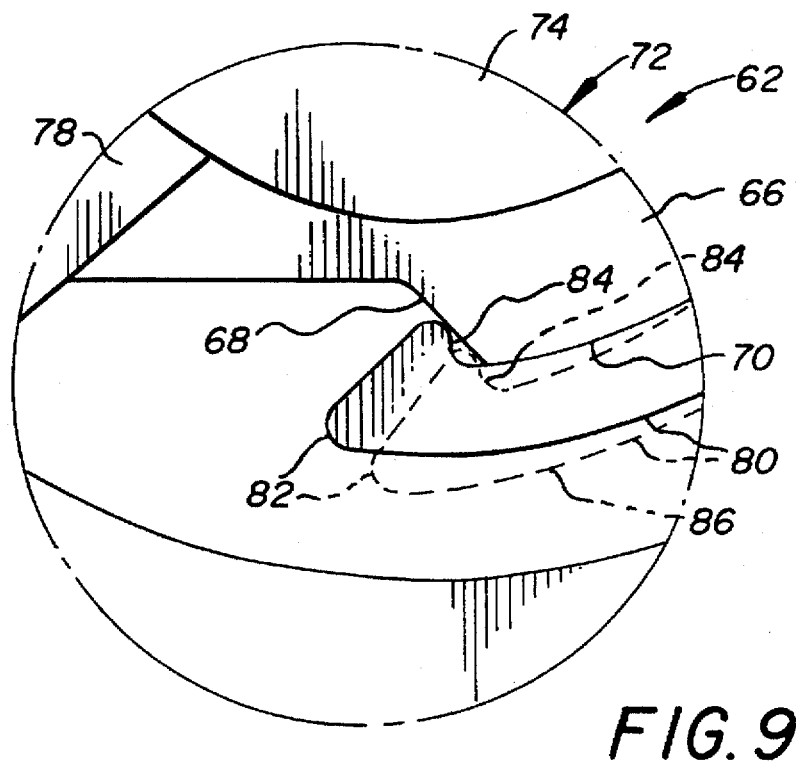
FIG. 9 is an enlarged view of the portion of FIG. 8 within the circle 9 showing the torque releasing operation of the clutch.

When the thumbwheel 64 is moved clockwise as shown in the figures, the hook ends 84 engage the sloping teeth 68, as shown in FIGS. 8 and 9, and transmit a limited torque to the hub-cam to rotate the cam in the film advance direction and advance the film within the camera. If an excessive force is applied by the camera operator, such as may occur when the film metering mechanism, not shown, stops the film at the next photo location or the film is wound to the end of its travel, the ends 84 of the resilient arm hooks 82 will ride outwardly up the surfaces of the teeth 68, as shown in the dashed lines 86 in FIG. 9, so as to release the clutch 62 and limit the torque that may be applied to the film advance mechanism.

It should be apparent that, as in the first described embodiments, the clutch embodiment 62 could be modified by providing the hook arms with sloping end surfaces instead of the radial surfaces 84 and providing the hub-cam with either the sloping teeth 68 shown or alternative radial teeth. In either case, an outward camming force would exist which, upon reaching a predetermined torque level, would allow the clutch to slip and limit the applicable torque in the same manner as in the described embodiments.

While the invention may utilize any appropriate tooth or arm slip angle on its engaging surfaces and any suitable materials for the engaging elements, it was found in tests of a clutch arrangement similar to that shown in FIG. 4 that a combination of polycarbonate in one of the clutch elements and acetyl in the other with a slip angle of 42.5° resulted in a release force of 15.53 ounce-inches with a standard deviation of only 0.43 ounce-inches. Similarly, a clutch made with similar materials and a 45° slip angle gave an average release force of 11 ounce-inches and a standard deviation of 0.63 ounce-inches. These clutch materials and angles provided a release force of approximately a selected value of 12 ounce-inches, twice the maximum of 6 ounce-inches of torque required to advance the film through the camera under normal conditions.

The materials utilized provided improved results over slip clutches where both components were made of polycarbonate. Such a clutch tested with a 45° slip angle gave an average release force of 13.3 ounce-inches but had a standard deviation of 2.15 ounce-inches, showing that the friction properties of the engaging polycarbonate surfaces were relatively high and irregular. It is, accordingly, preferred at present to use diverse materials for the clutch components. While any suitable materials may be selected, it is presently preferred to use an amorphous polymer such as polycarbonate styrene for one of the elements and a semi-crystalline polymer such as nylon or acetal for the other.

If desired, a torque limiting one-way clutch according to the invention may be used in a rewind drive of a film transport mechanism as well as in the film advance mechanisms illustrated.

Although the invention has been described by reference to certain specific embodiments, it should be understood that numerous changes may be made within the spirit and scope of the inventive concepts described. Accordingly, it is intended that the invention not be limited to the described embodiments, but that it have the full scope defined by the language of the following claims.

| Parts List |
| --- |
| 10. camera |
| 12. body |
| 14. cavity |
| 16. cassette |
| 18. film |
| 20. take-up spool |
| 22. metering stop |
| 24. slot |
| 26. advance thumbwheel |
| 27. film transport mechanism |
| 28. clutch |
| 30. outer ring |
| 32. cam |
| 34. inner surface |
| 36. arm |
| 38. outer surface |
| 40. end |
| 42. tooth (abutment) |
| 44. clutch |
| 46. cam |
| 47. outer surface |
| 48. tooth (abutment) |
| 50. slip angle |
| 52. clutch |
| 54. outer ring |
| 55. inner surface |
| 56. resilient arm |
| 58. end |
| 60. slip angle |
| 62. clutch |
| 64. thumbwheel |
| 66. hub-cam |
| 68. teeth |
| 70. outer surface |
| 72. drive element |
| 74. drive hub |
| 76. drive shaft |
| 78. cross arm |
| 80. resilient arms |
| 81. inner surface |
| 82. hooks |
| 84. end surfaces |
| 86. dashed lines |

What is claimed is:

1. A camera manual film transport mechanism having a torque limiting one-way drive clutch, said clutch having coaxial relatively rotatable drive and driven members with radially opposed inwardly and outwardly facing surfaces, an abutment on one of the surfaces and a force transmitting arm connected with the other of the surfaces and resiliently urged toward said one surface at an angle nearer to tangential than to radial and effective to engage a free end of the arm with said abutment for transmitting torque between the drive and driven members when rotated in a direction to engage the arm and abutment, the arm detaching from the abutment upon rotation in an opposite direction and flexing to ride over the abutment and avoid reverse torque transmission, said clutch characterized by;

an angled surface on at least one of the arm free end and the abutment for camming the arm out of engagement with the abutment upon the application of excessive torque to the drive member; and one of said engaging surfaces being an amorphous polymer and the other being a semi-crystalline polymer.

2. The invention as in claim 1 characterized in that both the abutment and the free end of the arm are formed with angled surfaces.

3. The invention as in claim 1 characterized in that said arm is connected to the drive member and the abutment is provided on the driven member.

4. The invention as in claim 1 characterized in that said arm is connected to the driven member and the abutment is provided on the drive member.

5. The invention as in claim 1 characterized in that the angled surface forms an angle between 40 and 45 degrees from radial.

6. The invention as in claim 1 characterized in that said abutment is engaged by a linearly outer portion of the free end so the arm is loaded in compression.

7. The invention as in claim 1 characterized in that said abutment is engaged by an inner hook portion of the free end so the arm is loaded in tension.

8. The invention as in claim 1 characterized in that said arm extends from said inwardly facing surface and said abutment is provided on said outwardly facing surface.

9. The invention as in claim 1 characterized in that said inwardly facing surface is formed on the drive member.

10. The invention as in claim 1 characterized in that said clutch is connected with a film advance wheel of the mechanism.

11. The invention as in claim 1 characterized in that said amorphous polymer is polycarbonate styrene and said semi-crystalline polymer is selected from the group consisting of nylon and acetal.

* * * * *